UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

MANUFACTURE OF COMPOUNDS FOR FURNACE-LININGS AND FIRE-BRICK.

SPECIFICATION forming part of Letters Patent No. 266,144, dated October 17, 1882.

Application filed September 4, 1882. (No specimens.)

*To all whom it may concern:*

Be it known that I, JAMES HENDERSON, of Bellefonte, county of Centre, State of Pennsylvania, (formerly of New York,) have invented certain new and useful Improvements in the Manufacture of Compounds for Furnace-Linings and Fire-Brick, of which the following is a specification.

The object of my invention is to produce a compound for refractory furnace-linings and fire-brick which shall be extremely infusible or capable of resisting very high and long-continued heats, and which may be applied and produced at very small expense, and which will not contract when exposed to high temperatures.

To this end my invention consists in a certain new composition of matter which is composed of the following ingredients: I take hydrated magnesian lime and mix it with water to a thick mortar, either with or without a vegetable binding substance from which sugar or starch may be derived; or I may take ordinary hydrated lime and mix with it a compound of glucose and water, as described in another application for Letters Patent now pending, filed on or about May 5, 1882, and form it into blocks, which are dried at the ordinary temperature, and afterward subjected in any suitable furnace or kiln to a temperature high enough to frit or harden the block. Such furnace may be an open-hearth steel-melting furnace, and the block may be exposed therein at the highest temperature for from three (3) to six (6) hours, which treatment causes the lime or magnesian lime, prepared as hereinbefore described, to frit and contract to the extreme limits of contraction and become very hard and firm. The lime or magnesian lime, after the treatment above described, is pulverized preferably sufficiently fine to pass through a sieve of about three thousand six hundred meshes to the square inch. To these one hundred (100) parts of pulverized lime or magnesian lime in the fritted state I add slaked or hydrated lime or magnesian lime, in the proportions of one (1) to five (5) per cent., by weight, and in the dry state, and they are thoroughly mixed and sufficient water is added to permeate the mass, and the whole is worked over until a thorough and intimate mixture is effected, when it is ready for use for the walls or linings of hearths of reverberatory furnaces, Bessemer converters, and other metallurgic vessels (or for refractory uses where it is not exposed to moisture or air) when applied in the wet state and dried at the ordinary temperature; or it may be molded into brick, which are ready for use when dried at the ordinary temperature or baked in the usual manner.

If preferred, the lime or magnesian lime which has been fritted may be almost free from other mineral substance, or silica, alumina, oxide of iron, or fluor-spar may be in admixture with it, if not in sufficient amount to impair its refractory properties or capability to resist high temperatures.

The material of a previous operation may be used in admixture with hydrated lime or magnesian lime, instead of the lime or magnesian lime which has been fritted or hardened, as herein described.

I do not wish to be understood as limiting my invention to the proportions hereinbefore described, as the hydrated lime or magnesian lime may be used in larger proportions than those given and good results be obtained. Nor do I claim as a part of this invention the use of magnesian lime in combination with silica, alumina, oxide of iron, or fluor-spar, except when they are used as herein described.

What I claim, and desire to secure by Letters Patent, is—

The process of manufacture of furnace-linings or fire-brick, consisting in subjecting lime or magnesian lime to sufficiently high temperatures to frit or harden it, and, secondly, to pulverize the fritted or hardened lime or magnesian lime and mix it with hydrated lime or magnesian lime, as specified.

JAMES HENDERSON.

Witnesses:
SCHUYLER DURYEE,
LEWIS THOMPSON.